Nov. 8, 1949 W. M. HAWKINS, JR 2,487,548
MAIN LANDING GEAR

Filed April 11, 1947 2 Sheets-Sheet 1

INVENTOR
WILLIS M. HAWKINS
BY
George C. Sullivan
Agent

Nov. 8, 1949  W. M. HAWKINS, JR  2,487,548
MAIN LANDING GEAR
Filed April 11, 1947  2 Sheets-Sheet 2

INVENTOR
WILLIS M. HAWKINS
BY George Sullivan
Agent

Patented Nov. 8, 1949

2,487,548

UNITED STATES PATENT OFFICE 2,487,548

MAIN LANDING GEAR

Willis M. Hawkins, Jr., North Hollywood, Calif., assignor to Lockheed Aircraft Corporation, Burbank, Calif.

Application April 11, 1947, Serial No. 740,909

5 Claims. (Cl. 244—102)

This invention relates to an improved and more compact landing gear, especially for large aircraft, wherein the provision of a multiplicity of landing wheels reduces the overall size and weight as compared to an equivalent single landing wheel.

More specifically, this invention consists of the arrangement of main landing wheels for an aircraft in which two trucks, each containing two wheels, are mounted in tandem on separate and independent shock absorption systems. The main cylinders of these shock absorbers are connected so that the frame comprising the two cylinders and the connecting structure has sufficient strength to carry the fore and aft loads of the landing gear. The entire system of four wheels and two shock cylinders is arranged to retract in an inboard direction, pivoting about the upper end of the shock absorbing cylinders and is completely enclosed within the outline or envelope of the airplane fuselage and/or wing.

Among the objects of this invention are included the incorporation of small wheels to carry the large loads involved in heavy aircraft, thereby reducing the weight of the main gear, reducing the load on the gear required to spin up large wheels in landing, and utilizing the tandem arrangement of small shock struts to provide an efficient bending truss to take the fore and aft loads of the gear. The arrangement of small wheels provides a landing gear which is small in total volume for a given load carrying capacity. The tandem arrangement of the wheels permits articulation of the shock-absorbing elements of the two struts and thus eliminates the need of torque scissors between each element and its strut to maintain wheel alignment.

Other objects and features of the invention will be readily understood from the following detailed description of typically preferred forms of the invention wherein reference will be made to the accompanying drawings in which.

Figure 2:
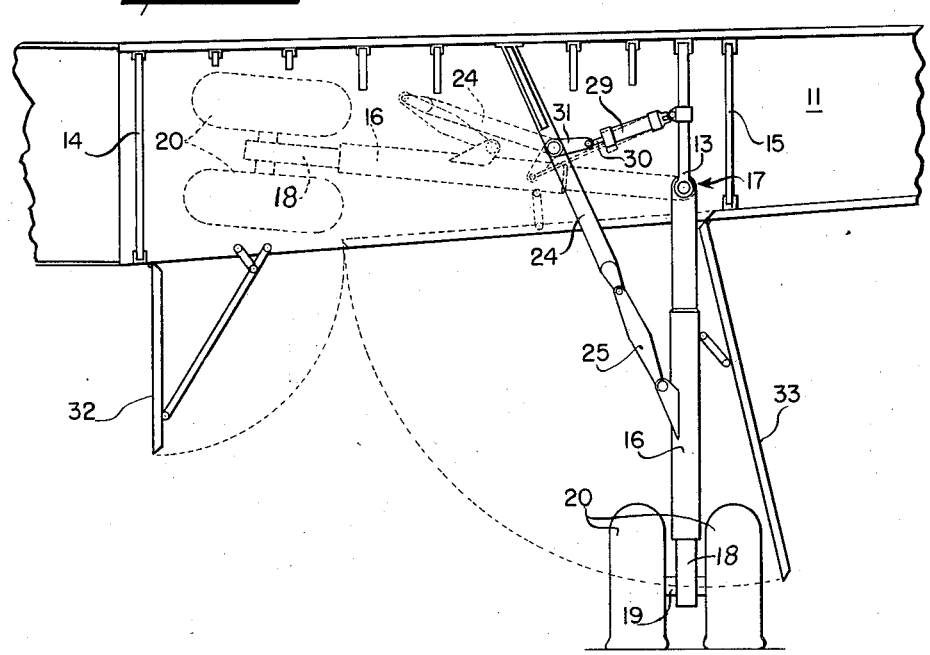
Figure 2 is a front elevation of the gear shown in Figure 1 as applied to an airplane, the dotted lines showing the retracted position of the gear within the envelope of the airplane wing.
Figure 3:
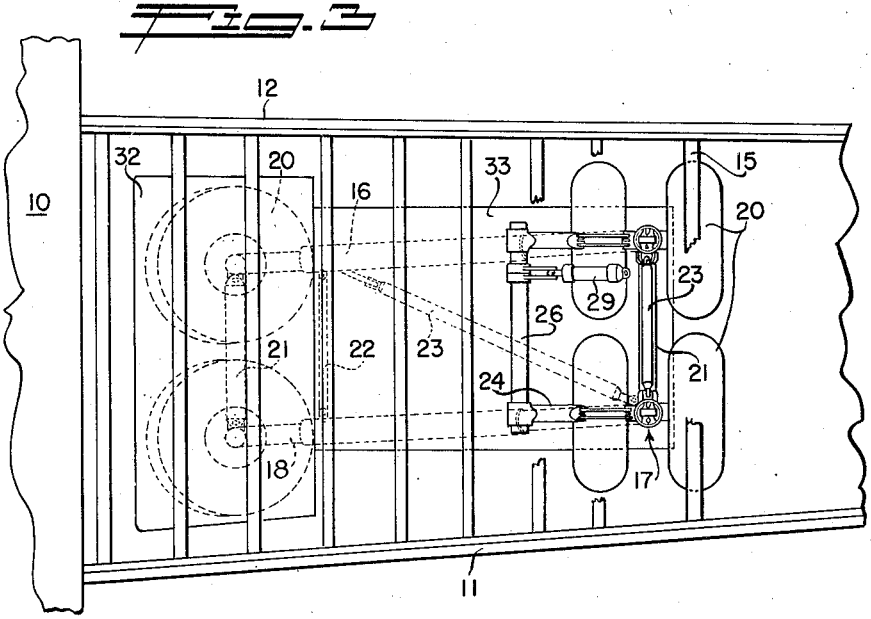
Figure 3 is a top plan view of Figure 1 with the wing covering omitted, showing the gear extended in full lines and retracted in dotted lines.

As shown on the drawing, an airplane fuselage 10 and front and rear spars 11 and 12 of one wing are indicated in Figures 2 and 3, the leading and trailing edges of the wing having been omitted for clearness. The landing gear, to be hereinafter described, is pivoted to internal bracing 13 in the wing and is intended to retract by swinging sidewise and inboard into the space between the ribs 14 and 15, within the envelope or profile of the wing between the front and rear spars 11 and 12.

Figure 1:
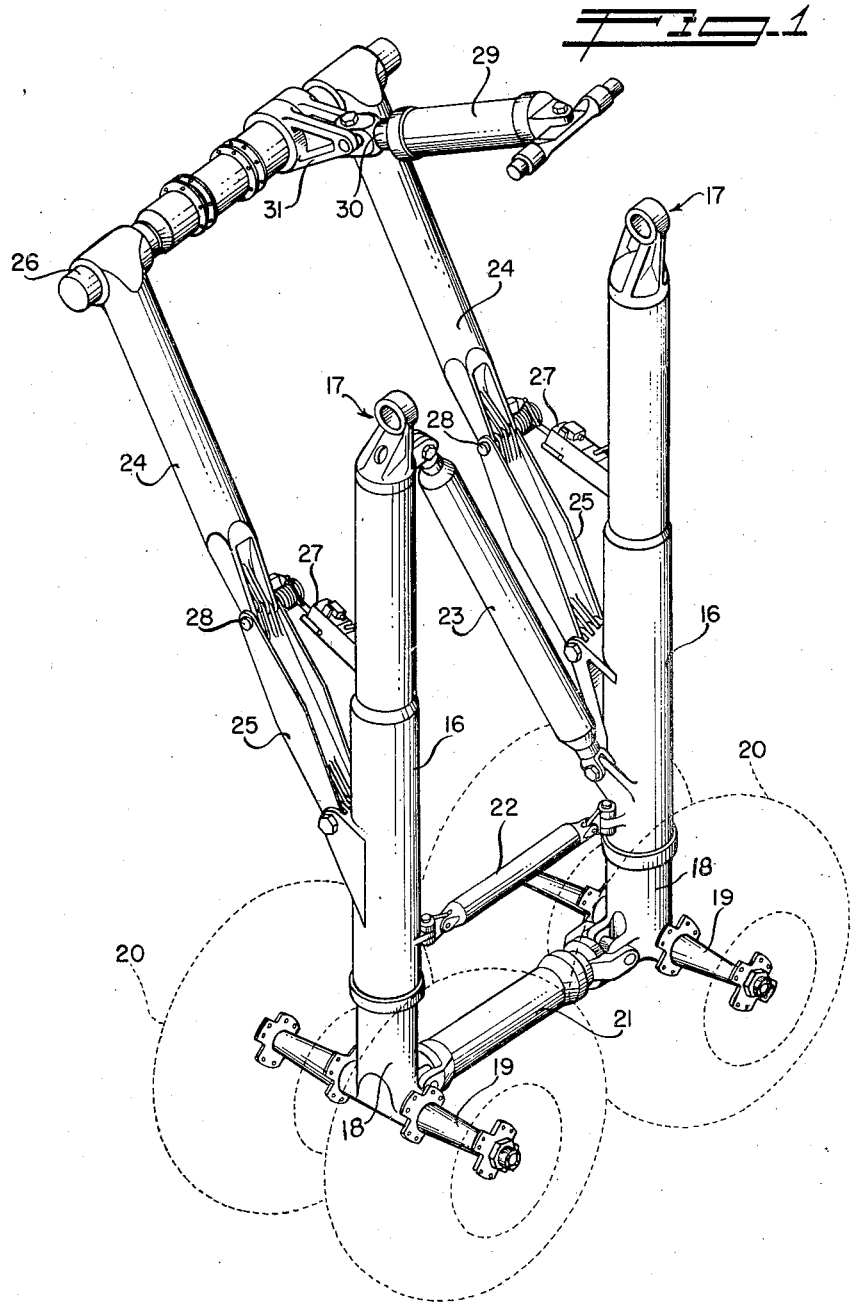
Figure 1 is a perspective view of an aircraft main landing gear embodying the features of this invention.

As best shown in Figure 1, the landing gear comprises a pair of spaced shock struts of the pneumatic and/or hydraulic type comprising upper outer cylinders 16 pivoted to the bracing 13 at 17 and inner pistons or cylinders 18 telescoping into the outer cylinders and carrying axles 19 at their lower or free ends, each axle 19 extending on both sides of its piston and carrying wheels 20 on both sides thereof. The wheels are shown in dotted lines in Figure 1 for convenience in bringing out the details of a trucklike telescoping link 21 connecting the two axles, this link being vertically articulated to each of the pistons to permit independent shock absorbing action of each shock strut in the event the pairs of wheels encounter ground irregularities. This articulated link also eliminates the need of torque scissors to maintain alignment of the wheels with the airplane center line.

The two outer cylinders are interconnected by a lower link 22 and a diagonal link 23, which, with the upper pivots 17, form a rigid structure to resist the drag forces or fore and aft loads on the landing gear. The assemblage of the two outer cylinders and the drag struts thus form a rigid truss disposed in a plane in line with the axis of the airplane, and swing together as a unit for retraction, whereas the movable or shock absorbing pistons 18 are independently movable in the plane of the rigid assemblage above described.

The gear is side braced by a pair of pivoted links 24 and 25, aligned with each of the outer cylinders 17, the upper links 24 being rigid with a connecting shaft 26 pivoted to the aircraft structure. When the gear is extended the links 24 and 25 are substantially aligned and a down lock 27 engaging their common pivot point 28 holds them in this position until the down lock is released prior to retraction of the gear. Retraction is accomplished by means of a hydraulic cylinder 29, the piston 30 of which engages a lever 31 on the shaft 26 to rotate the shaft and upper links 24 clockwise in Figures 1 and 2, thus folding the links 24 and 25 together into the dotted line position of Figure 2. It will be understood that the hydraulic cylinder both extends and retracts the gear as controlled by the hydraulic circuit (not shown).

While not directly pertinent to the present invention, suitable landing gear doors 32 and 33 open to allow extension of the gear, and close thereover upon retraction of the gear into the envelope of the wing.

In the operation of the landing gear of my invention the airplane, when in contact with the ground, rests on the two main gear units as disclosed herein plus a conventional nose or tail wheel (not shown). Each main gear, comprising a pair of struts, is locked in the extended position shown in several views and in that position the upper cylinders are braced fore and aft by the pivot mountings 17, lower link 22, and diagonal or drag link 23, which serve to resist ground and braking forces in the general plane of the two struts. Side pressures on the struts are absorbed by the links 24 and 25 which also serve to extend or retract the landing gear as a unit. The two shock absorbing pistons 18, each carrying a pair of wheels or other ground engaging means, are free for independent vertical movements in their respective cylinders 16, but are restrained from swiveling therein by the connecting link 21 which is pivoted or articulated to permit such independent vertical movements of each pair of wheels, while maintaining wheel alignment to eliminate the need of torque scissors.

Having thus described my invention and the present preferred embodiments thereof, I desire to emphasize the fact that many modifications may be resorted to in a manner limited only by a just interpretation of the following claims.

I claim:

1. An aircraft landing gear construction including a pair of tandem telescopic shock absorbing members each comprising relatively fixed elements and movable elements carrying wheels, said pair of members being pivotally mounted to the airplane in parallel with each other and retractable into the airplane envelope as a unit, drag bracing interconnecting the relatively fixed elements of said members, and a pivoted telescoping link between the movable elements of said members whereby said movable elements maintain wheel alignment and independently absorb shocks incident to ground contact by the wheels carried thereby.

2. An aircraft landing gear construction including a pair of telescopic shock absorbing members each comprising fixed elements and movable elements carrying wheels, said members being dependent from the aircraft in tandem parallel alignment with each other, drag bracing interconnecting the fixed elements of said members, and a link pivoted between the movable elements of said members whereby said movable elements are independently movable vertically to absorb shocks incident to ground contact by the wheels carried thereby.

3. A main landing gear construction for aircraft comprising a pair of shock struts disposed in parallel with each other and in a plane parallel to the longitudinal axis of the aircraft, said shock struts including elements fixed relative to the aircraft and movable telescoping elements associated with each of said fixed elements, said movable elements carrying ground engaging means, drag-struts rigidly interconnecting said relatively fixed elements, and vertically flexible means interconnecting said movable elements adapted to maintain longitudinal alignment between said ground engaging means.

4. An airplane landing gear construction for aircraft comprising a pair of tandem shock struts disposed in a plane parallel to the longitudinal axis of the airplane, each shock strut consisting of a fixed member and a movable member telescoping relative to said fixed member, said movable members each supporting at least one landing wheel for independent motion relative to the other movable member, drag-struts rigidly connecting the fixed members of said shock struts in the plane thereof, and means pivotally connecting the movable shock absorbing members whereby to provide a vertically articulated truck interconnecting the landing wheels carried thereby.

5. An airplane landing gear construction for aircraft comprising a pair of tandem shock struts disposed in a plane parallel to the longitudinal axis of the airplane, each shock strut consisting of a fixed member and a movable member telescoping into said fixed member, said movable members each supporting at least one landing wheel for independent shock absorbing motion relative to the other member, and means pivotally connecting the movable shock absorbing members whereby to provide a vertically articulated truck interconnecting the landing wheels carried thereby.

WILLIS M. HAWKINS, Jr.

REFERENCES CITED

The following references are of record in the file of this patent:

UNITED STATES PATENTS

| Number | Name | Date |
| --- | --- | --- |
| 1,302,508 | Caproni | May 6, 1919 |
| 1,342,138 | Stupar | June 1, 1920 |

FOREIGN PATENTS

| Number | Country | Date |
| --- | --- | --- |
| 208,550 | Great Britain | June 15, 1925 |
| 460,118 | France | Sept. 26, 1913 |
| 467,415 | Great Britain | June 14, 1937 |
| 556,325 | Great Britain | Sept. 29, 1943 |

OTHER REFERENCES

Ser. No. 430,821, Saulnier (A. P. C.) pub. May 25, 1943.